Feb. 11, 1936. E. A. KINNEY ET AL. Re. 19,851

RADIO PROGRAM SELECTING APPARATUS

Original Filed June 7, 1933 2 Sheets-Sheet 1

INVENTORS
EDWARD A. KINNEY
JOSEPH W. GALLIGAN
ATTORNEY
Arthur D. Thomson

Feb. 11, 1936. E. A. KINNEY ET AL Re. 19,851
RADIO PROGRAM SELECTING APPARATUS
Original Filed June 7, 1933 2 Sheets-Sheet 2
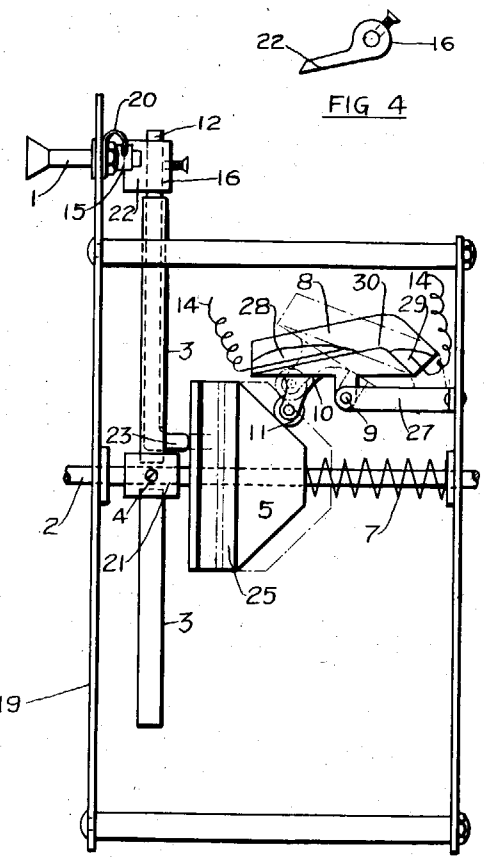
FIG 4
FIG 3
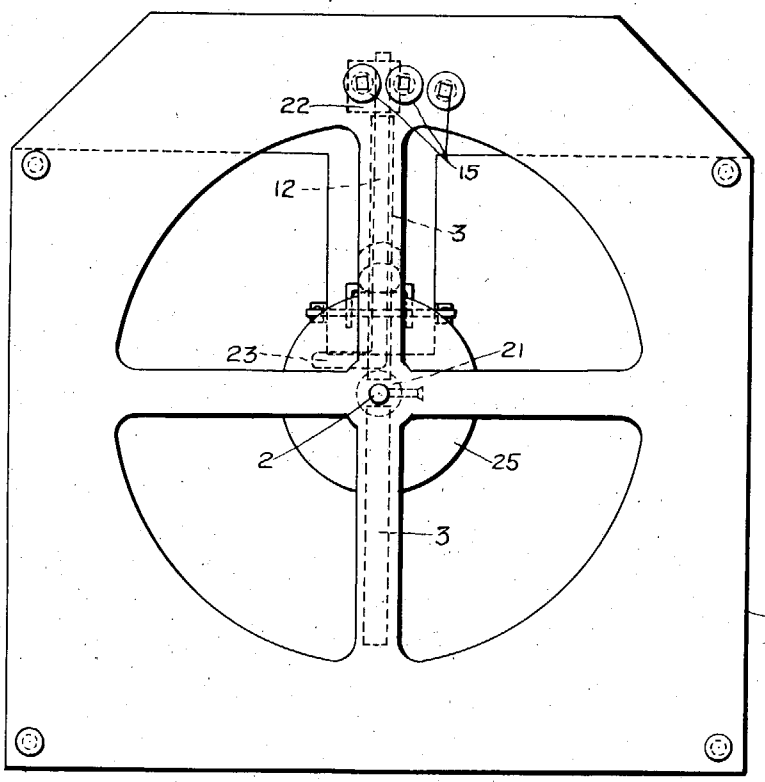
FIG 2
INVENTORS
EDWARD A. KINNEY
JOSEPH W. GALLIGAN
By ATTORNEY Arthur D. Thomson Reissued Feb. 11, 1936

Re. 19,851

UNITED STATES PATENT OFFICE 19,851

RADIO PROGRAM SELECTING APPARATUS

Edward A. Kinney, Watertown, and Joseph W. Galligan, Jamaica Plain, Boston, Mass.

Original No. 1,939,267, dated December 12, 1933, Serial No. 674,670, June 7, 1933. Application for reissue December 13, 1935, Serial No. 54,300

7 Claims. (Cl. 200—38)

This invention relates to radio program selecting apparatus, and pertains more particularly to time-controlled devices for closing an electric circuit of a radio receiver or other electrical apparatus at predetermined intervals. The principal purpose of the invention is to provide simple, economical and efficient mechanism operable by a rotating shaft of an electric or mechanical clock, for closing a non-arcing switch in a radio receiver circuit and for holding said circuit closed during one or more selected intervals over a definite time period. Another object is to provide a series of convenient control buttons located around the periphery of the clock face whereby the operating mechanism may be set for such predetermined intervals as may be chosen in advance, so that the radio will be automatically operated to receive the particular programs desired and to exclude unwanted broadcasts. Further objects reside in the structural features of the apparatus herein described and pointed out in the appended claims.

A recommended embodiment of the invention is illustrated in the accompanying drawings, in which:

Fig. 2 is a front view of the frame work and essential operating mechanism of the apparatus, the control buttons and several of the control button bushings being omitted;

Fig. 3 is a side elevation looking to the left of Fig. 2, with one of the control buttons in place; and Fig. 4 is a detail edge view of a cam member or shoe which is arranged to be engaged by the inner ends of selected control buttons.

Figure 1:
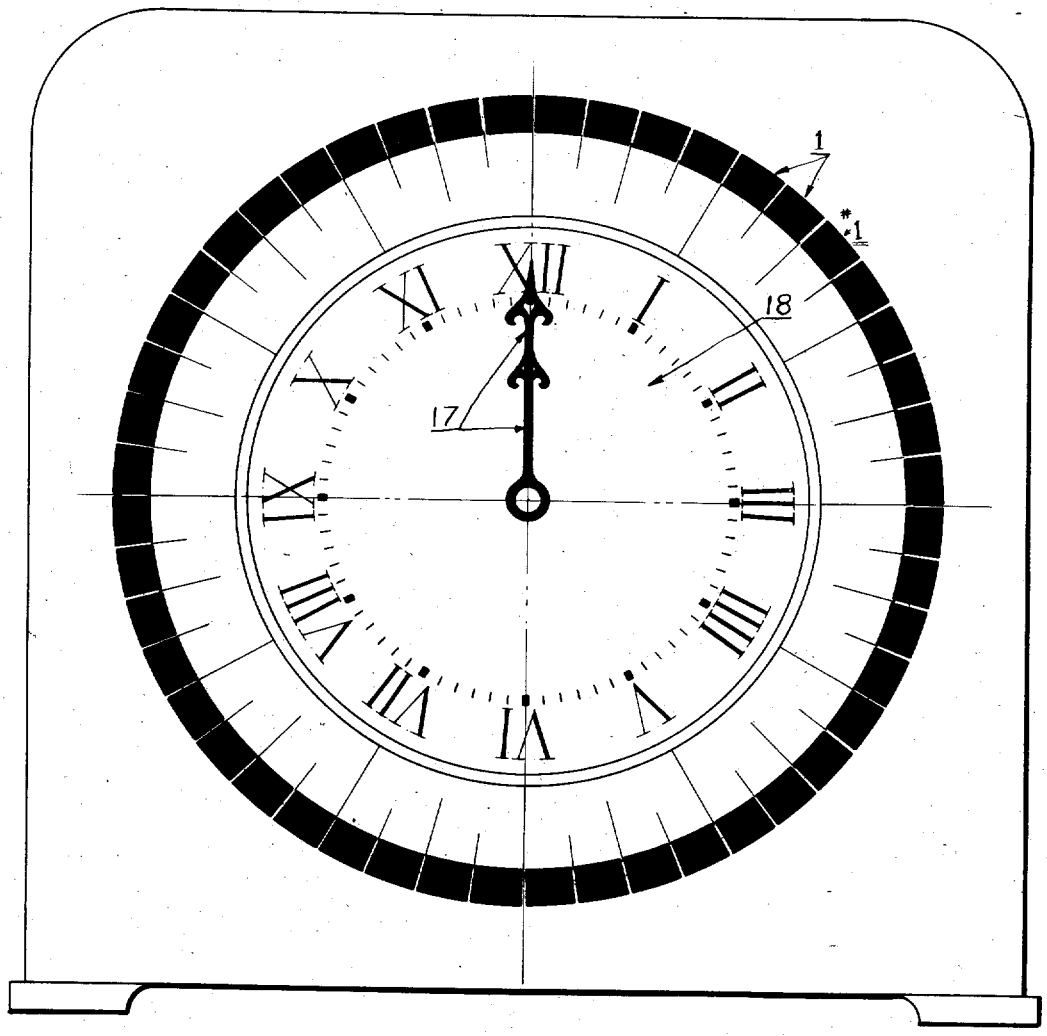
Fig. 1 is a front view of the improved apparatus, showing the clock face and the control buttons.

In the particular embodiment chosen for the purpose of illustration, the time controlled apparatus comprises a horizontal shaft 2 which is mounted for rotation in a suitable framework and which preferably constitutes the hour hand shaft of a suitable timing device (not shown) such as an ordinary electric or mechanical clock. The front end of the shaft carries the hands 17 which turn over the clock face 18 (suitable gearing being provided for the minute hand); and the rear end of the shaft may be geared or connected to the clockwork or clock motor in any usual manner.

A series of forty-eight control buttons 1 are arranged around the periphery of the clock face, and have shafts movable inwardly and outwardly in complemental bushings 15 provided in the front wall 19 of the framework. The respective push buttons represent fifteen minute intervals of each hour during a twelve hour period, and are so aranged with relation to the clock face that any desired interval may be quickly and easily selected, as indicated in Fig. 1. In setting the circuit-closing mechanism, any desired number of buttons are pushed inwardly at any time in advance of the period selected; and the buttons may be held in operating position by spring clips 20 (Fig. 3).

The inner end of each depressed button is located in the path of movement of a shoe or cam member 16 which is fixed to a lever 12 partially rotatable in one of the arms of a spider or arm 3 having a hub 21 fixed to the shaft 2 as by a set screw 4. As the shaft 2 is timed to rotate once in twelve hours, the spider arm 3 and lever shoe 16 also make one complete revolution in twelve hours. The shoe is in operative position with respect to each control button for a period of fifteen minutes, the width of the cam face 22 being regulated to engage the end of a depressed push button for the stated interval.

The lever or rod 12 has an offset inner end 23 which projects rearwardly through, and is movable angularly in an opening in the hollow arm 3 of the spider (the opposite arm of the spider serving merely as a counterweight). The eccentric lever end 23 engages a collar or actuator member 25 which is preferably slidable along the shaft 2 and is normally urged forwardly toward the lever by a light coil spring 7, and the actuator preferably has a conical face 5 at its rearward end.

The switch for the radio circuit preferably consists of a mercury tube 8 supported on a cradle pivoted at 9 to a bracket 27, the electrodes of the mercury switch having pigtails 14 in the circuit of the receiver. The cradle is provided with a roller 11 which bears upon the cone part 5 of the actuator so that the tube 8 is tilted on its pivot 9 as the actuator is moved along the shaft 2. In the position shown in full lines in Fig. 3, the circuit of the mercury tube is open; whereas in the position indicated by broken lines, the circuit is closed to operate the receiver. Inoperative position is normally maintained by gravity or by yielding means (not shown) such as a coil spring arranged on the pivot pin 9 in the usual manner.

It will be observed that the tube 8 is bent or angular in shape so that, when the switch is inoperative, the mercury is divided between the two depending ends of the tube to provide two pools 28 and 29 which are separated by the elbow 30.

The electrodes located at the opposite ends of the tube are thus submerged in the mercury, and the contact is made by union of the two bodies of mercury when the tube is tipped or tilted by the actuator. The ends of the respective electrodes are constantly covered by mercury in both open and closed positions of the switch, thereby eliminating all possibility of fire by arcing, and reducing the likelihood of corrosion of the electrodes. This feature is particularly important when the switch controls a radio receiver, because of the amplification of all noise or electrical disturbances in the circuit such as would be caused by including the wiping shoe and control buttons in the electric circuit of the receiver.

The operation of the time-controlled switch-closing mechanism above described in smooth, silent, efficient and substantially fool-proof through the avoidance of wiping or brushing contacts in an electrical circuit; and the entire apparatus is compact and simple to construct and assemble. When the mechanism is in normal or inoperative position the movable push buttons are out; the actuator 25 is held forwardly by spring 7, allowing the mercury switch to tilt toward level position and swinging the eccentric lever end 23 forwardly to rotate the rod 12 and move the cam or shoe toward the front plate 19. The shoe will revolve upon rotation of shaft 12 without striking any control button in outward or inoperative position, but will engage the shaft end of any depressed or closed button. Such engagement rotates the shoe and twists its lever arm to move the actuator or collar rearwardly, and hence tilts the mercury switch to operative or closed position. As soon as the shoe passes the depressed push button (or series of consecutive buttons) the lever arm is released and the mechanism is restored to normal position by spring 7.

Each closed button causes the switch to remain closed for fifteen minutes as aforesaid, and the selected radio program will be heard for that interval. If successive buttons are depressed the program continues without interruption for the full period corresponding to the number of buttons which have been closed, after which the radio circuit is automatically opened.

When the shaft 12 is geared to, or forms part of the spindle of an electric clock motor, the wiring to the clock may be bridged across the electrical circuit to the radio receiver in advance of the mercury switch, so that the current for both clock and radio may be supplied from a single outlet.

We claim:

1. Time-controlled mechanism for closing an electrical circuit for predetermined intervals during a time period, comprising a shaft rotatable once during said period, a switch in said circuit, a movable actuator for operating said switch, a member connected to and rotatable with said shaft for moving the actuator, said member having a shoe portion, and a series of control buttons corresponding in number to said time intervals, said buttons being depressible into the path of movement of said shoe so that engagement of the shoe with a depressed button will operate said member to move the actuator and close the switch, and spring means for restoring the actuator to inoperative position after the shoe has passed the depressed button.

2. Time controlled mechanism for closing an electrical circuit for predetermined intervals during a time period, comprising a shaft rotatable once during said period, a mercury switch in said circuit, a movable actuator for tilting said switch, a lever for moving the actuator, means connecting the lever to said shaft so that the lever revolves once during said time period, the lever having a shoe, and a series of control buttons corresponding in number to said time intervals and arranged in spaced circumferential relation about the axis of the shaft, said buttons being depressible into the path of movement of said shoe so that engagement of the shoe with a depressed button will operate the lever to move the actuator and close the switch.

3. Time-controlled mechanism for closing an electrical circuit for predetermined intervals during a time period, comprising a shaft rotatable once during said period, a switch in said circuit, an actuator slidable along said shaft for operating said switch, a lever for moving the actuator, the shaft having an arm connecting the lever thereto so that the lever revolves once during said time period, the lever having a shoe, and a series of control buttons corresponding in number to said time intervals, said buttons being depressible into the path of movement of said shoe so that engagment of the shoe with a depressed button will operate the lever to move the actuator and close the switch, and a spring normally urging the actuator to inoperative position so that the actuator is restored to inoperative position after the shoe and depressed button are disengaged, thereby to open the switch.

4. Time-controlled mechanism for closing an electrical circuit for predetermined intervals during a time period, comprising a shaft rotatable once during said period, a mercury switch in said circuit, a movable actuator slidable along the shaft for tilting said switch, a lever having an end engaging said actuator, an arm connecting the lever to said shaft so that the lever revolves once during said time period, the lever having a shoe at its opposite end, a series of control buttons corresponding in number to said time intervals and arranged in spaced circumferential relation about the axis of the shaft, said buttons being depressible into the path of movement of said shoe so that engagement of the shoe with a depressed button will twist the lever to move the actuator and close the switch, and yielding means for holding the actuator in inoperative position.

5. In a radio program selecting apparatus, time-controlled mechanism for automatically closing an electric circuit for predetermined intervals during a time period, comprising a shaft rotatable once during said time period, a switch in said circuit, means for operating said switch including a movable actuator, a spring normally holding the actuator in inoperative position, an arm connected to said shaft and rotatable therewith, and a lever for moving the actuator carried by said arm and provided with a shoe, and a series of control buttons spaced around the path of movement of said shoe and selectively movable into said path so that the shoe will engage such buttons as are moved to operative position and thereby operate the lever to move the actuator and cause closing of the switch, said spring restoring the actuator to inoperative position after the shoe has passed such buttons, whereby the switch is opened.

6. In a radio program selecting apparatus, time-controlled mechanism for automatically closing an electric circuit for predetermined intervals during a time period, comprising a shaft rotatable once during said time period, a switch in said circuit, a movable actuator engageable with said switch, a member connected to and rotatable with said shaft for moving the actuator into engagement with the switch, said member having a shoe portion, and a series of control buttons corresponding in number to said time intervals, said buttons being movable into the path of movement of said shoe so that engagement of the shoe with such buttons will operate said member to move the actuator and positively close the switch.

7. Time-controlled mechanism for closing an electric circuit for predetermined intervals during a time period, comprising a shaft rotatable once during said period, a switch in said circuit, an actuator slidable along said shaft into engagement with the switch, a lever for moving the actuator, the shaft having an arm connecting the lever thereto so that the lever revolves once during said time period, the lever having a shoe, and a series of control buttons corresponding in number to said time intervals, said buttons being depressible into the path of movement of said shoe so that engagement of the shoe with a depressed button will operate the lever to move the actuator and positively close the switch.

EDWARD A. KINNEY.
JOSEPH W. GALLIGAN.